Jan. 21, 1969  J. S. HAWKES  3,422,836
VALVE FOR DUAL CHAMBERED TIRES
Filed June 20, 1966
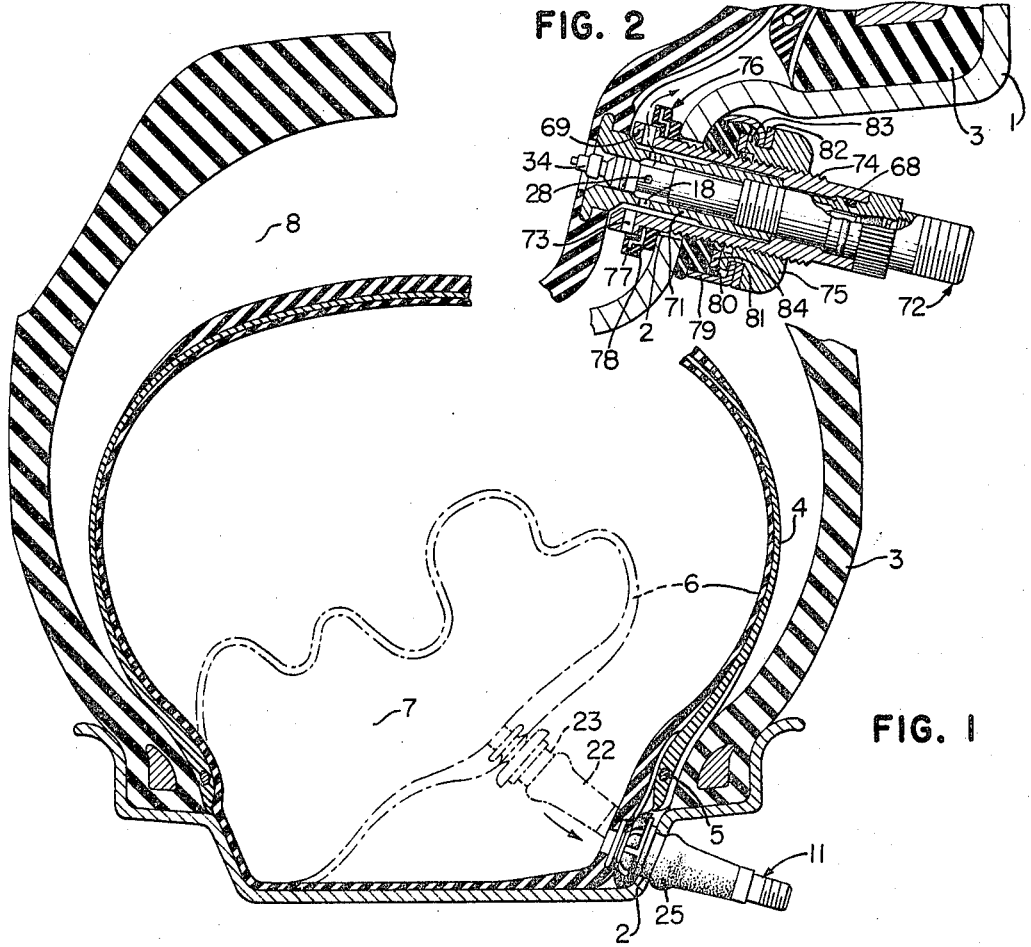
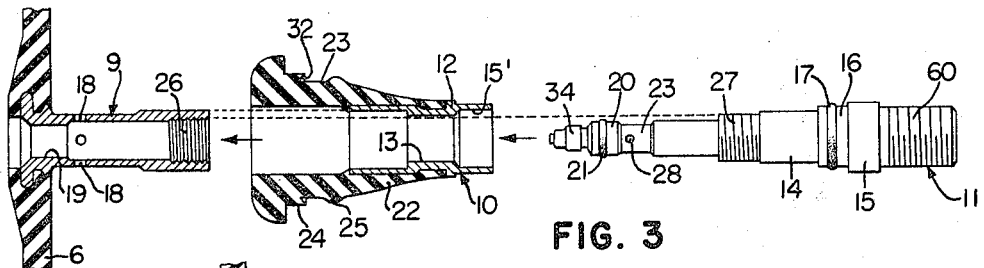
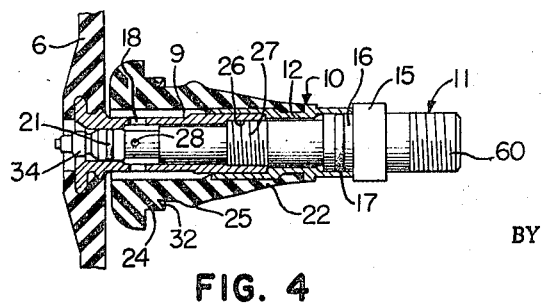
INVENTOR.
JOSEPH S. HAWKES
BY
*J. B. Holden*
ATTORNEY

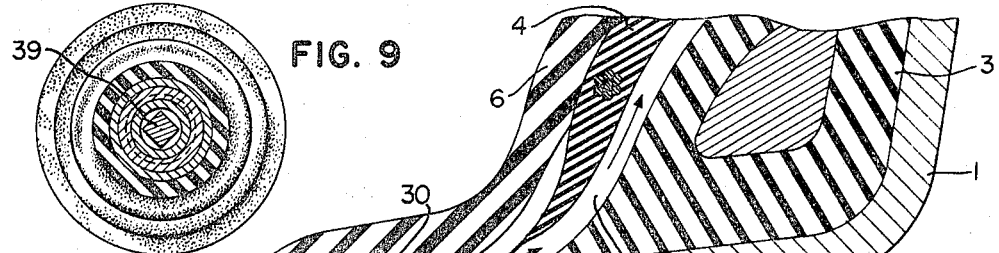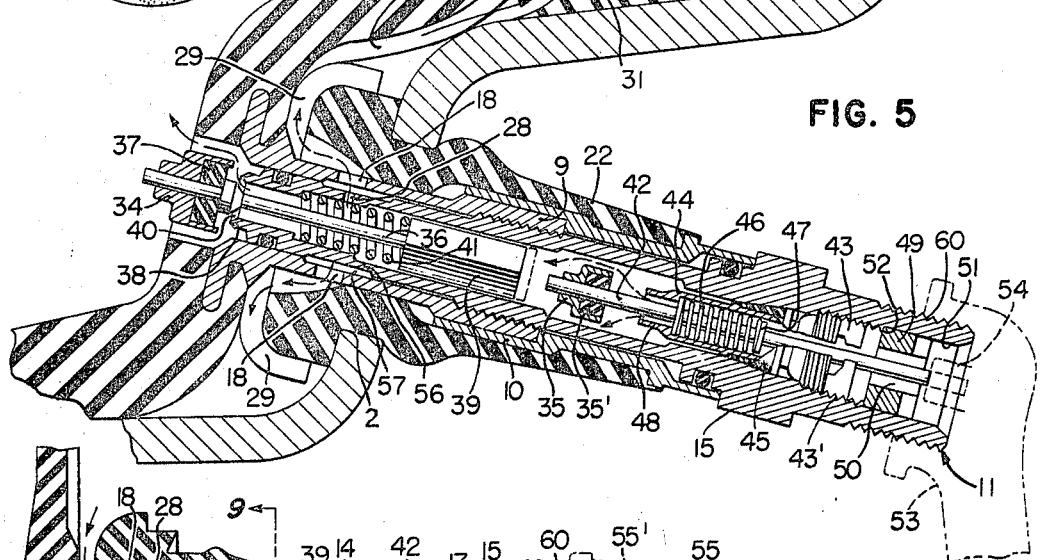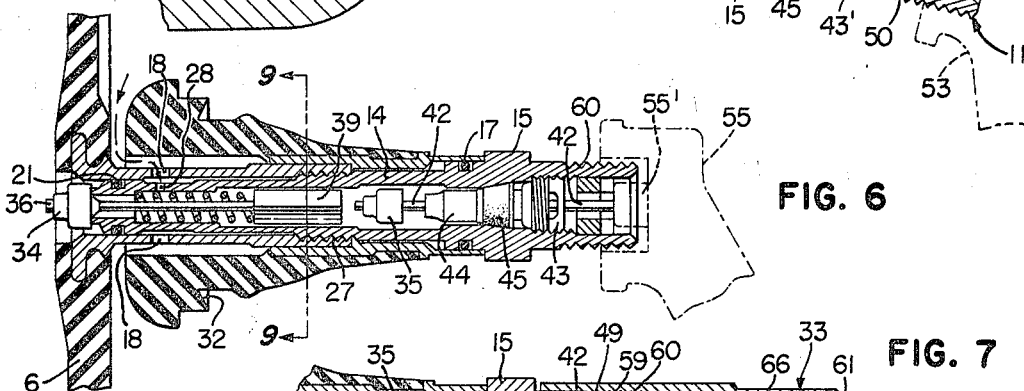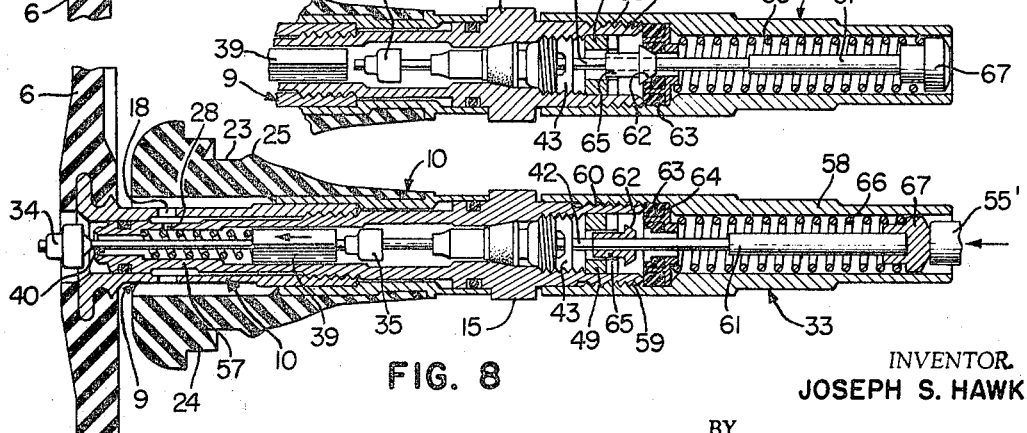

United States Patent Office 3,422,836
Patented Jan. 21, 1969

3,422,836
VALVE FOR DUAL CHAMBERED TIRES
Joseph S. Hawkes, Cuyahoga Falls, Ohio, assignor to The Goodyear Tire & Rubber Company, Akron, Ohio, a corporation of Delaware
Filed June 20, 1966, Ser. No. 558,842
U.S. Cl. 137—234.5          20 Claims
Int. Cl. B60c 29/00; F16k 15/20

The present invention relates to a valve, preferably of the snap-in type, for use in inflating and maintaining the pressures in two chambers of a dual chambered tire. Valves of this type are more complicated and substantially more expensive than the usual valves employed for inflating tires and tubes. The valve of this invention comprises three units. The inner unit or spud is attached to a wall dividing the tire into two chambers, an inner and an outer chamber, and has two ports for respectively supplying air to these chambers. The second or intermediate unit is a hollow tubular sleeve adapted to be seated within the rim hole of a rim and secured in place therein to maintain the valve in proper juxtaposition with the rim when assembled. This sleeve is held in place either in the manner of a snap-in valve or by clamping. The first and second units comprise a two part stem adapted to receive a third unit which is threaded to or otherwise secured to the stem to join the three units to form the complete valve. The third unit comprises a housing containing valve mechanisms which are used to control the supply of air to and through said ports of the spud in a manner to provide and maintain the desired pressures in the inner and outer chambers of the tire.

One object of this invention is to provide a valve for use with rims having valve holes of different sizes. As will appear later a suitable second unit of the snap-in type and of correct size is selected for the particular size of rim hole in the rim without changing the other units. In short, the first and third units may be standard for all or substantially all rims and the second unit, which is relatively inexpensive, may be selected for the proper size rim hole with which the valve is to be used. This means it is only necessary to provide different sizes of the rather inexpensive second unit and if it becomes damaged, replacement cost is low.

Another object is to provide means for distributing desired amounts of air to the chambers and for selectively checking the pressure in either of the chambers as required.

Another object is to allow demounting and removal of the air container or inner wall without removing the second unit from the rim, since the second unit must be cut or destroyed to remove it from the rim. New second units are also required when changing air containers to other rims.

In the drawings:
FIG. 1 is a radial cross-section through a dual chambered tire and valve mounted on a rim,
FIG. 2 is a fragmentary cross-section similar to FIG. 1 showing a modified mounting for the second unit,
FIG. 3 is an exploded view partly in section showing the three principal units of the valve,
FIG. 4 is a cross-sectional view through the valve showing the parts of the valve in assembled relation, but not mounted on the rim,
FIG. 5 is a fragmentary view of the assembly shown in FIG. 1, showing the valve in section and the parts in the position they occupy during inflation,
FIG. 6 is a cross-sectional view showing the positions of the parts during a pressure check of the outer chamber,
FIGS. 7 and 8 are cross-sectional views showing the adaptor and illustrating its use, and FIG. 9 is a fragmentary cross-section taken on the line 9—9 of FIG. 6.

In the drawings, a rim 1 has a rim hole 2 for receiving the valve and has a tubeless tire 3 mounted thereon. Within the tubeless tire there is arranged a thin walled, substantially inextensible, preferably fabric re-enforced inner tire 4 having beads 5. Within this tire 4 is arranged a separate inner tube or air container 6. The inner tire 4 and tube 6, which may also be integral, form an inner chamber 7 and constitute a dividing wall between the chambers 7 and 8. The outer chamber 8 is formed by the opposed walls of the inner and outer tires 3 and 4.

In all forms of the invention the valve is composed of three separate units. The first and second units are designated as the spud 9 and sleeve 10 constituting a two part stem while the third unit is designated as the valve mechanism 11. The invention will first be described in connection with a valve of the snap-in type (FIGS. 1 and 3–9 inclusive) in which the sleeve 10 comprises a tubular metal shell 12 having a reduced bore 13 for receiving the cylindrical part 14 of the housing 15 of the valve mechanism 11 and an enlarged bore 15′ for receiving the cylindrical part 16 of the housing 15. When the housing 15 is inserted in the tubular shell 12, an O-ring 17, mounted in a circumferential groove in the cylindrical part 16, forms an air seal between the inner wall of the bore 15′ and cylindrical part 16.

In FIG. 3 a portion only of the inner tube 6 is disclosed and while the inner tube 6 is illustrated in FIG. 1 as separate from the inner tire 4 it could be an integral part thereof. The spud 9 which is attached to the wall of the inner tube in any well-known manner, as by vulcanizing, has several circumferentially arranged, radially extending, ports 18 through which air may pass from the housing to the outer chamber 8 in a manner to be described later. It also has a bore 19 for receiving the reduced cylindrical portion 20 on the housing 15 which portion has an O-ring 21 mounted in a circumferential groove therein to form an air seal between the inner wall of the bore 19 and the reduced portion 20.

The valve may be assembled as a complete unit as shown diagrammatically in FIG. 1 by dotted lines and by full lines in FIG. 4. The valve is then pulled through the rim hole and snapped into the opening 2 in the rim as shown in full lines in FIG. 1. The shell 12 has a rubber body 22 vulcanized to the outer part of the shell 12 and it extends longitudinally beyond the inner end of the shell. The rubber body has a reduced diameter 23 adapted to engage the inner wall of the rim opening 2. Adjacent enlargements 24 and 25 assist in retaining the valve in the rim hole, and the reduced portion 23 in its unstressed condition as in FIG. 3 is of greater outer diameter than the inner diameter of the rim hole 2 so that the rubber is placed under compression when the valve is mounted. The compression is preferably sufficient to move the inner wall of the rubber body extending beyond the sleeve, into firm engagement with the outer surface of the spud.

In order to hold the three units in asembled position the spud 9 is provided with internal threads 26 adapted to receive the external threads 27 on the housing 15 (see FIG. 4). When air is supplied to the housing 15, part of the air may flow into the chamber 8 through a metering port 28 in the housing 15, which port is of materially less cross-section than the combined cross-sections of the ports 18 and then, as seen in FIG. 5, through the ports 18, the grooves 29 in the base of the rubber body 22, the grooves 30 in the outer wall of the inner tube 6 and then the grooves 31 in the outer wall of the inner tire 4 to the outer chamber 8 as indicated by arrows in FIG 5.

When the valve is fully assembled, the smallness of the port 28 will not permit fast deflation of the outer chamber through the housing when it is desired to demount the tire. The spud 9 and housing 15 should be unthreaded and the housing removed from the sleeve 10 to permit the air to flow freely from the chamber 8 through the ports 18 to the atmosphere while at the same time air is discharged from the inner chamber through the port or bore 19.

It will be noted from an inspection of FIG. 4, as well as FIGS. 6 and 8, that in the relaxed position, there is a recess 32 below the reduced diameter 23, but when the stem is inserted in the rim hole this recess disappears as the lip formed at the outer edge of the recess flattens out against the rim adjacent the rim hole as shown in FIG. 5 and forms a secondary air seal. Due to the radial compression of the rubber when it is in the rim hole, a portion of the rubber which is normally free of the spud is forced into engagement with the outer surface of the spud as seen in FIG. 5. It will be noted in FIGS. 1, 4 and 5 that the rubber may stretch axially inward close to or against the inner tube and it is for this reason that the grooves 29 are necessary in order to permit the air to flow from the ports 18 into the grooves 30 and 31 to the outer chamber. While not so shown in the drawings, the portion of the inner tube adjacent the valve actually includes a rubber base on the spud which base has pre-formed grooves 30, and when the base is vulcanized to the tube in the usual manner it becomes an integral part thereof and is so illustrated. The outer contour of the rubber portion 22 on the sleeve 10 may be in the form shown or it may be of any other construction satisfactory for sealing purposes. The essential feature is that the rubber should seal the valve firmly in the opening of the rim.

Referring now particularly to FIGS. 5, 6, 7 and 8, it is to be noted that FIG. 5 shows the positions of the valve parts during inflation, FIG. 6 illustrates the positions of the parts during a pressure check of the air in the outer chamber 8, FIG. 7 illustrates the positions of the parts when the adaptor 33 is in place prior to inflation or when preparing to check the pressure of the inner chamber and FIG. 8 is a view similar to FIG. 7 showing the positions of the parts during original inflation using low pressures or when the pressure in the inner chamber is being checked.

The housing 15 is made as a unitary tubular structure having a bore mounting an inner valve 34 and an outer valve 35. These valves are similar to but somewhat different than the standard valves commonly used. Being special valves it is desirable, as will be described later, that they be confined within the housing so that they cannot be replaced by standard cores.

The inner valve 34 is cup-shaped and crimped on a pin 36 and includes a sealing washer 37 adapted to seat against the V-shaped valve seat 38 at the inner end of the housing 15. The pin 36 is provided at its opposite end with a guide 39 which, as shown in FIG. 9, is square in cross-section with the corners acting as a means for guiding the valve longtiudinally in the housing but at the same time providing sufficient space, when the port 40 is open, for air to pass the guide through the spaces provided between the flat sides of the guide during inflation or a pressure check as illustrated in FIGS. 5 and 8. The cross-sectional shape of the guide 39 may be varied as desired as long as it provides a passage sufficient to allow air to flow freely past the guide. A spring 41 abuts a shoulder near the inner end of the housing and the inner end of the guide to urge the sealing washer 37 against the seat 38.

The outer valve 35 is cup-shaped and includes a washer 35'. The valve is crimped on the pin 42 which passes through the usual swivel 43 having external threads engaging internal threads 43' in the housing in the usual way. It has a tubular housing or barrel 44 with a tapered seal 45 seated against a correspondingly tapered seat on the inner wall of the housing and a spring 46 abuts against a collar 47 secured to the pin 42 to normally urge the valve 35 into closed position with its sealing washer 35' against the inner end of the housing 48. The main difference over a standard valve is that the outer or right hand end of the pin 42 is longer than normal to provide for greater travel of the valve 35 for a purpose to be described later. The swivel 43 extends into the bore of the housing 15 to a greater extent than normal and there is a stop 49 outwardly thereof having a central opening 50. This stop is preferably press-fitted into a bore 51 of the valve housing although it could also be threaded into the housing in which case it is preferable to lock it in place to prevent its removal. Its inward movement is limited by a shoulder 52 at the outer end of the threaded portion 43' of the housing 15. The stop should be irremovably mounted in the housing since the outer valve is a special valve having a longer pin on it than the usual valves of this type and a user should not be able to remove it and replace it with a standard valve which would not give the desired results.

During inflation, as in FIG. 5, an air chuck 53, shown in dotted lines, is applied to the outer end of the housing in the usual manner and this has a depressing pin 54 for moving the pin 42 from the dotted position shown in FIG. 5 to the full line position shown. This opens the valve 35 only and permits air to pass into the housing and through the metering opening 28 into the outer chamber in the manner previously described. During inflation, the pressure of the air acting against the valve 34 opens the valve as illustrated in this figure to permit air to pass into the inner chamber through the port 40. The spring for the inner valve in this example is relatively weak to permit opening of the valve under air pressures in the order of 125 p.s.i. whereas a stronger spring may keep the valve closed when using such pressures. There is a particular purpose in not having movement of the outer valve open the inner valve and this is best illustrated in FIG. 6 in which the valve is illustrated with the parts in the positions they occupy during a pressure check of the pressure in the outer chamber. The chuck 55 of a pressure gauge is applied in the usual manner as illustrated in FIG. 6 and the pin 55' depresses the pin 42 the same as in FIG. 5 where the depressing pin 54 of the air chuck depresses the pin 42. However, no air is being supplied to the housing as during inflation to open valve 34 and the spring 41 on the inner valve and the pressure in chamber 7 keeps the inner valve 34 closed so that air cannot leave the inner chamber and enter the housing 15. The pressure of the air in the outer chamber 8 will be transmitted to the pressure gauge through the ports 18, metering port 28 and the housing 15. This is the normal pressure check made on a valve since the inner chamber usually does not lose air and it is the riding pressure of the outer chamber that is important.

At times it becomes necessary to check the inner chamber pressure such as after initial inflation. In order to do so it is necessary to positively open the inner valve 34 and let the air flow from the inner chamber through the housing to the gauge. In order to do this it is necessary to provide extended travel for the pin 42 to cause it to engage the outer end of the guide-block 39 when the pressure gauge is applied and this is accomplished by using the adaptor 33 illustrated in FIGS. 7 and 8, which will be described in detail later. Normally when the inner valve 34 is open air will not flow from the outer chamber into the housing since the pressure of the air in the inner chamber is greater than that in the outer chamber. The amount of air that may flow to the outer chamber through the ports 28 and 18 during the short time the pressure in the inner chamber is being checked will be negligible and will not materially affect the pressures in the chambers.

Before proceeding with a description of the adaptor shown in FIGS. 7 and 8 it is pointed out that the size of the metering port 28 is preferably in the order of .034" diameter and has a cross-sectional area of approximately .0009″ and the ports 18 preferably have a combined cross-sectional area equal to about 12 times the cross-sectional area of the metering port 28. As a typical example, when four ports such as 18 are used, they should have diameters in the order of .055″–.060″. If only two ports 18 are used the cross-sectional area of each port should be larger. For example, in one particular assembly, the cross-sectional area of the port 28 is .0009″ and the combined cross-sectional areas of four ports 18 is about .011″. Two ports such as 18 have been used which are elongated in the direction of the length of the housing to minimize weakening the spud while maintaining the total desired cross-sectional area equal to four openings. This is a matter of choice but the ports 18 should be large enough to permit free flow of air to the atmosphere when the housing is removed as when it is desired to deflate the outer chamber. Otherwise it would be difficult to deflate the outer chamber ahead of the inner chamber and thus prevent collapsing of the inner chamber wall.

It will be noted that in the area adjacent the metering opening 28 the outer diameter of the housing 15 is reduced in diameter at 56 (FIG. 5) to provide an air chamber 57 between the housing and the spud 9. The inner end of the housing, except in the vicinity of the groove 56, has a close fit with the spud 9 and unless the groove 56 is provided, the flow of air through ports 18 and 28 may be restricted since there is no assurance that any of the ports 28 will be in alignment with port 18.

In FIGS. 7 and 8 the adaptor 33 is shown removably threaded on the valve housing. It is normally used for initial inflation and for checking the pressure of the inner chamber. This adaptor may be used as part of the valve mechanism for use in initial inflation of both chambers to insure full opening of the valve 34 where line pressures are not sufficiently high to overcome the closing pressure of the spring 41. With racing cars, particularly, where speeds are high it is preferable that the valve 34 be provided with a spring 41 having a closing force equal to or greater than that of the spring 46 of the outer valve 35 to be sure the inner valve will remain closed at high speeds. In this case, unless the adaptor is used, line pressures of 180 p.s.i. or more may be required. Weaker springs also may open under centrifugal forces acting on the valve and thus reduce the differential pressure needed to hold the beads of the inner tire against the beads of the outer tire. It is understood that during inflation when both valves are opened by positive action, due to the use of the adaptor, the air will flow into the two chambers according to the rates established by the sizes of the ports 28 and 40.

For normal use, after the initial inflation, it is preferable to remove the adaptor since thereafter, in normal use, only the pressure of the outer chamber is measured. No harm will result in leaving the adaptor in place but when checking the pressure in the outer chamber the operator must remember to remove the adaptor.

The adaptor 33 comprises an outer tubular housing 58 having internal threads 59, threaded on the external threads 60 on the housing 15. The adaptor has a pin 61 carrying a valve 62 crimped thereto near its inner end and this valve seats on a rubber sealing ring 63 mounted on a metal plate 64 abutting against a shoulder in the bore of the housing 58. The valve 62, is provided with an integral reduced cylindrical portion 65 having a small enough outer diameter to pass freely through the opening 50 in the stop 49. The inner end of the reduced portion engages the pin 42. A compresion spring 66 abuts the plate 64 and the inner surface of the head 67 whereby the valve 62 is normally closed and the head 67 is substantially flush with the outer end of the housing 58.

In FIG. 7, it will be noted, that with the adaptor in place, the inner end of the reduced portion 65 abuts against the outer end of the pin 42 so that valve 35 but not the valve 34 is opened. During threading of the adaptor to the valve housing there is a very short period of time when a negligible amount of air may be released from the housing between the threads on the housing and adaptor since the valve 35 is open. But, as soon as the adaptor is completely seated it will be noted that the rubber gasket 63 will prevent air from escaping.

Note in FIG. 7 that the valve pin 42 has not moved a distance sufficient to cause engagement of the inner end of the pin 42 with the outer end of guide-block 39 so that the inner valve remains closed until, as in FIG. 8, the pin 61 is moved to the left by the pin 55′ on a pressure gauge such as 55 in FIG. 6 or the pin 54 on a chuck such as 53 in FIG. 5. When the pin 61 is depressed the valve 62 opens and the inner end of the pin 42 engages the outer end of the guide-block 39 and continued movement of pin 61 moves the block to cause the valve 34 to open, permitting a measurement of the pressure in the inner chamber which is now in open communication with the gauge or permitting inflation of the chambers as the case may be.

In FIG. 2 there is shown a variation of the means for holding the stem in place in the valve rim. The shell of the stem is designated by the numeral 68 and except for the fact it has an extended portion at the inner end formed with a lateral flange 69 it performs substantially the same function as the shell 10 in the other figures, namely, as a means for locating the spud 71 and the housing 72 in joined relation. The spud 71 and housing 72 are substantially the same as the spud 9 and housing 15 in FIGS. 3–8 inclusive. The flange 69 at the inner end of the stem has lateral ports 73 extending therethrough which are in communication with the ports 18 and 28 and the outer chamber 8 as in FIG. 3. The shell of the stem is externally threaded at 74 for a considerable portion of its length and a nut 75, having internal threads, is threaded on the stem to provide clamping pressure to hold the stem in position on the rim. A washer 76 is arranged between the flange 69 and the rim and this takes the force of the clamping pressure created by the nut 75. The washer 66 comprises a metal insert 77 having a cross-section as shown in FIG. 2 with two radially extending, axially facing portions at different radial distances and spaced axially of each other. The washer is rubber covered at 78 to effect sealing of the gap between the walls of the hole in the rim and the adjacent outer surface of the stem 69. It will be noted that the metal washer and the general contour of the rubber thereon provides two seats at different radial distances and when a rim having a larger hole is employed the stepped-down portion or seat at the outer periphery engages the rim to effect the seal instead of the inward portion or seat as shown in the drawings. When the outer sealing surface is used the inner seal enters the rim hole and centers the valve in the hole.

The nut 75 carries a normally cylindrical cup-shaped metal member 79 swiveled on the nut 75 which encompasses a rubber sealing washer 80 which abuts against the outer surface of the rim and when the nut is advanced to clamp the valve in place the rubber seals the space between the walls of the rim opening and the stem. It will be noted that in the section shown in FIG. 2, the part of the rim radially outward from the hole takes a sharp bend to the right and does not provide a flat surface as in some rims. The outer wall of the cup-shaped member 79 is constructed to collapse under the clamping pressure as shown in the drawings without destroying the sealing action of the rubber against the rim. The nut 75 has a recess 81 which receives the washer 82 which abuts against the cup-shaped member 79 and the inwardly extending flange of the cup-shaped member 79. This is to provide for ease in rotating the nut during the clamping action. Also in order that the inner flange 83 of the nut will not abrade the rubber washer 80, a ring 84 of a hard rigid material, preferably metal, is embedded in the rubber and, when the flange 83 is urged against the rim, the force of the clamping action is taken mainly by the ring. This avoids any substantial abrasion of the rubber washer by the flange on the nut 75. This valve is also used with an adaptor 33 such as in FIGS. 7 and 8.

FIG. 2 shows an alternative method of clamping the shell of the stem in place. The other features and advantages of the construction present in the valves shown in FIGS. 1 and 3 to 9 inclusive are present in the valve constructed according to FIG. 2.

In operation, with the chambers 7 and 8 uninflated and the adaptor 33 in place, air is supplied to both chambers due to opening of both valves 34 and 35 by the pin on the air chuck. The inner chamber pressure can then be measured while the adaptor is in place. By removing the adaptor it is then possible to measure the outer chamber pressure as in normal use. Generally, the adaptor is removed for normal use after inflation so that thereafter the riding pressure of the outer chamber is readily measured the same as in measuring the pressures in ordinary tires of the tube type or tubeless variety.

In mounting the tire it may be preferable to use a tool attached to the assembled valve, to pull it through the rim hole after the tires 3 and 4 and inner tube 6 are positioned on the rim. Or the sleeve 10 may be mounted in the rim and then the spud 9 and housing 15 inserted therein and joined. It is not necessary to remove the sleeve 10 when demounting the tire.

While the grooves 29 do not appear in FIGS. 6 and 8 it is to be understood that such grooves are present but in these views since the valves are sectioned through the lands between the grooves, the grooves do not appear. The valves may be suitably identified by a marking indicating the size of the rim hole with which it is to be used.

Note particularly in FIG. 5 that the housing 15 is made as a unitary tubular member. In assembling the valves in the housing the inner valve mechanism minus the valve 34 and washer 37 is first inserted in the housing from the outer end thereof and positioned at the inner end as shown. Then the cup-shaped portion carrying the washer, is crimped on the valve pin to hold it in place to prevent removal of the assembly from the housing. It will be noted that the parts, other than the cup-shaped valve 34 and washer 37 are small enough to pass freely through the opening which receives the tubular housing 44 of the outer spring 46. Next the outer valve mechanism is positioned in the housing and the stop 49 arranged in position as described.

As used in the claims the terms "first," "second" and "third" ports is intended to include one or more ports having a sufficient size for the claimed purpose as for example, there are a plurality of openings 18 leading to the outer chamber and while each could be smaller in cross-section than the third port 28 the combined cross-sections should be substantially larger than the third port for the purpose described and claimed.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. Valve mechanism for supplying air to a space formed by a tire rim, having a valve receiving hole, and a tire mounted on said rim comprising a stem adapted to be mounted in said rim hole for supplying air to said space including a tubular shell and a tubular spud extending into one end of and releasably mounted in said shell, said stem having a port adapted to communicate with said air space when said stem is mounted on said rim, means for mounting said stem in said rim hole including a first sealing means on said shell providing an air seal between said stem and the adjacent wall of said hole, a housing extending into the other end of said shell and having a passage communicating with said port, means on said spud and housing releasably uniting them in fixed position within said shell, a second sealing means between said housing and stem, and a valve in said housing controlling the flow of air into and out of said passage.

2. Valve mechanism as set forth in claim 1 for use with a tire and rim combination set forth in claim 1 in which there is a wall dividing said air space into first and second chambers, and in which said spud is adapted to be attached to said wall with said one port, constituting a first port, for communicating with said first chamber and in which said valve constitutes a first valve, a second port in said stem communicating with said second chamber, a second valve in said housing for cutting off communication between said first and second ports, the opposed walls of said housing, at least adjacent said second port, being spaced from each other and said second sealing means including longitudinally spaced sealing elements between the adjacent walls of said stem and said housing at opposite sides of said second port to form with said walls, a third chamber, and a third port in the wall of said housing communicating with said third chamber and passage, one of said second and third ports being substantially smaller in cross-section than the other port to determine the rate of flow of air between said passage and second chamber with respect to the rate of the flow of air between said passage and said first chamber through said first port.

3. Valve mechanism as set forth in claim 2 in which said third port is substantially smaller in cross-section than that of said second port.

4. Valve mechanism as set forth in claim 2 in which there is a second valve arranged at the inner end of said housing, between said first and third ports which, when closed, cuts off communication between said first and second ports, said third port being arranged intermediate said valves, said valves being normally independently movable with respect to the other.

5. Valve mechanism as set forth in claim 3 in which there is arranged a second valve at the inner end of said housing, between said first and third ports which, when closed, cuts off communication between said first and second ports, said third port being arranged intermediate said valves, said valves being normally independently movable with respect to the other.

6. Valve mechanism as set forth in claim 4 in which said first valve has a normal permissible movement sufficient to be opened by the usual inflation chuck or pressure gauge without actuating said first value and a permissible extended movement to engage and open said first valve by suitable actuating means having means provided thereon to give it said extended movement.

said first valve has a normal permissable movement suf-

7. Valve mechanism as set forth in claim 1 in which said first sealing means comprises a body of rubber arranged on the outer circumferential surface of said shell and having a portion thereof which is to be arranged in said rim hole, said portion being of larger outer diameter than the inner diameter of the rim hole whereby it is compressed radially inward by the wall of said rim hole when arranged therein.

8. Valve mechanism as set forth in claim 7 in which said body of rubber has an integral tubular portion projecting axially inward beyond the inner end of the shell, the inner wall of which, radially inward of said enlarged diameter, forms a recess of a cross-section greater than that of the adjacent outer wall of said spud whereby the said inner wall of the recess will be forced into engagement with the spud by the compression of the rubber body when the stem is mounted in said rim hole.

9. Valve mechanism as set forth in claim 7 in which the rubber body on the shell has a radially projecting axially outward facing annular shoulder at its inner end to limit axial outward movement of the shell when positioned in said hole and to provide a secondary seal with the adjacent inner surface of the rim adjacent the rim hole.

10. The combination set forth in claim 1 in which said shell is provided with a stop at one end thereof for limiting its outward movement relative to the rim and in which said means for mounting said stem on said rim includes a sealing means on the shell for disposition between said stop and the rim and a nut, provided with sealing means, for clamping the stem firmly in position in the rim hole when mounted on the rim.

11. Valve mechanism for inflating both chambers of a safety tire provided with first and second air chambers separated by a dividing wall, comprising a stem adapted to be mounted on said wall including a tubular shell and a tubular spud extending into one end of and removably received within said spud, a valve housing having a passage therethrough, said housing extending into the other end of and being mounted in said shell, said spud and housing each having means thereon releasably engaging the other to releasably unite said spud and housing within said stem, said stem having a first port at the inner end thereof for supplying air to said first chamber, and a second port in a wall of the stem for supplying air to said second chamber, valve means mounted on said housing for controlling the flow of air to and from said chambers through said ports, the opposed walls of said housing and stem when assembled being spaced from each other at least adjacent said second port sufficient to form a space therebetween and means sealing said space between said housing and stem at longitudinally spaced positions at opposite sides of said second port to form with the walls of said stem a third air chamber between said stem and housing, and an open third port in the outer wall of said housing communicating with that third chamber, said second port also communicating with said third chamber and with said outer chamber whereby air may flow between said passage and outer chamber through said third port, said third chamber and said second port, said third port having an effective cross-section substantially smaller than said second port to restrict the flow of air to said passage and outer chamber during inflation when said housing is in place but permitting more rapid discharge of air from said outer chamber to the atmosphere through said larger second port when said housing is removed from said stem.

12. Valve mechanism for inflating both chambers of a safety tire and rim combination provided with a wall separating first and second air chambers in the space between said tire and rim comprising, a stem having a passage therethrough and a base adapted to be attached to said wall and provided with first and second ports for communicating with said first and second chambers respectively to permit air to flow between said chambers and passage, a first valve for admitting air to said passage and ports, a second valve in said stem arranged at the inner end of said stem to close said first port and, when closed, cut off flow of air between said first and second ports, said first valve having a normal permissible travel to open position less than necessary to open said second valve by engagement with means on said second valve and having additional permissible extended movement sufficient to engage said means on said second valve and open said second valve to permit checking the pressure in said inner chamber by use of depressing means constructed to provide said extended movement, and stop means in said passage outwardly of said first valve to permit only normal movement of said valve by the depressing pin on the usual inflation chuck or pressure gauge and limiting movement of said first valve by said depressing pin to an amount less than that required to effect opening of said second valve.

13. Valve mechanism as set forth in claim 12 in which said first valve comprises a barrel, a pin extending through said barrel and a valve washer on the inner end of said pin, a spring for biasing said washer to closed position on a seat formed on said barrel, a stop disposed outward of said barrel and having a central opening in alignment with said pin, said hole in said stop having a cross-section such as to prevent entry of the usual depressing pin of an air chuck or gauge to prevent other than normal movement of said pin of said first valve for normal inflation, an adaptor releasably supported on said stem and having a normlly closed third valve comprising an actuating pin, with the pin being of a cross-section to enable it to enter said opening in said stop and of a length such that when said adaptor is moved into operative position the pin of said third valve will engage and move said pin of said first valve sufficient to at least partially open said first valve but not said second valve while said third valve is closed, said first valve pin having a portion at its inner end adapted to engage said means on said second valve and open said second valve when said pin of said third valve is depressed by the usual pressure gauge or air chuck when applied to the adaptor in the usual manner.

14. Valve mechanism as set forth in claim 13 in which the second valve has an actuating pin the outer end of which has an enlargement which is engageable by the pin of said second valve to open said second valve when extended movement of said pin on said second valve is accomplished by movement of said pin of said third valve.

15. Valve mechanism as set forth in claim 13 in which the second valve has an actuating pin the outer end of which has an enlargement which is engageable by the pin of said first valve to open said second valve when extended movement of said pin on said first valve is accomplished by movement of the pin of the valve on the adaptor, said enlargement also having portions thereof having sufficient engagement with the walls of the passage in said stem to guide said pin of said second valve while permitting passage of the air between said first and second valves past said enlargement.

16. Valve mechanism as provided in claim 12 in which the passage through said stem is provided by a housing removably mounted in said stem and spaced from the wall of the stem at least in the vicinity of said second port, longitudinally spaced sealing means between said housing and stem positioned at opposite sides of said second port to form a third chamber with the opposed walls of said housing and stem, a third port in said housing between said first and second valves opening into said third chamber, the cross-section of said third port being substantially smaller in cross-section than the cross-section of said second port whereby, on removal of said housing from said stem, air may be discharged rapidly from said second chamber through said second port.

17. Valve mechanism as provided in claim 13 in which the passage through said stem is provided by a housing removably mounted in said stem and spaced from the wall of said stem at least in the vicinity of said second port, longitudinally spaced sealing means between said housing and stem positioned at opposite sides of said second port to form a third chamber with the opposed walls of said housing and stem, a third port in said housing between said first and second valves opening into said third chamber, the cross-section of said third port being substantialy smaller in cross-section than the cross-section of said second port whereby, on removal of said housing from said stem, air may be discharged rapidly from said second chamber through said second port.

18. Valve mechanism as provided in claim 14 in which the passage through said stem is provided by a housing removably mounted in said stem and spaced from the wall of said stem at least in the vicinity of said second port, longitudinally spaced sealing means between said housing and stem positioned at opposite sides of said second port to form a third chamber with the opposed walls of said housing and stem, a third port in said housing between said first and second valves opening into said third chamber, the cross-section of said third port being substantially smaller in cross-section than the cross-section of said second port whereby, on removal of said housing from said stem, air may be discharged rapidly from said second chamber through said second port.

19. Valve mechanism as provided in claim 15 in which the passage through said stem is provided by a housing removably mounted in said stem and spaced from the wall of said stem at least in the vicinity of said second port, longitudinally spaced sealing means between said housing and stem positioned at opposite sides of said second port to form a third chamber with the opposed walls of said housing and stem, a third port in said housing between said first and second valves opening into said third chamber, the cross-section of said third port being substantially smaller in cross-section than the cross-section of said second port whereby, on removal of said housing from said stem, air may be discharged rapidly from said second chamber through said second port.

20. Valve mechanism as set forth in claim 19 in which said stem comprises a spud provided with said first and second ports and a shell for mounting in said rim hole, the shell being provided with air sealing means for sealing it in said rim hole, said spud and housing having means for separably uniting them within said shell to permit removal of said housing and spud from said shell.

References Cited

UNITED STATES PATENTS

| | | | |
|---|---|---|---|
| 1,865,231 | 6/1932 | Buck | 137—223 |
| 2,043,380 | 6/1936 | Kirkpatrick et al. | 152—427 |
| 2,513,817 | 7/1950 | Pennington | 152—429 XR |
| 2,991,821 | 7/1961 | Williams | 152—427 |
| 3,246,680 | 4/1966 | Boyer | 152—427 |
| 3,361,153 | 1/1968 | Krohn et al. | 152—427 X |

FOREIGN PATENTS 585,682  2/1947  Great Britain.

WILLIAM F. O'DEA, *Primary Examiner.*

DENNIS H. LAMBERT, *Assistant Examiner.*

U.S. Cl. X.R.

152—427

UNITED STATES PATENT OFFICE
CERTIFICATE OF CORRECTION

Patent No. 3,422,836                                    January 21, 1969

Joseph S. Hawkes

It is certified that error appears in the above identified patent and that said Letters Patent are hereby corrected as shown below:

Column 6, line 39, "66" should read -- 76 --. Column 8, line 30, "there is a" should read -- said --; same line 30, after "valve" insert -- is --; line 31, "which" should read -- and --; line 37, "there is arranged a" should read -- said --; same line 37, after "valve" insert -- is arranged --; line 38, "which" should read -- and --; lines 46 and 47, "first", each occurrence, should read -- second --. Column 9, line 14, "spud" should read -- shell --. Column 10, lines 22 and 23, "second", each occurrence, should read -- first --.

Signed and sealed this 24th day of March 1970.

(SEAL)
Attest:

Edward M. Fletcher, Jr.                          WILLIAM E. SCHUYLER, JR.
Attesting Officer                                        Commissioner of Patents